United States Patent Office 2,838,384
Patented June 10, 1958

2,838,384

COMBUSTIBLE GEL

Harold F. Sloan, Marquette, and George K. Greminger, Jr., Francis E. Windover, and Samuel M. Rodgers, Jr., Midland, Mich., assignors of one-fourth to Cliffs Dow Chemical Company, Marquette, Mich., a corporation of Michigan, and three-fourths to The Dow Chemical Company, Midland, Mich., a corporation of Delaware No Drawing. Application March 11, 1957
Serial No. 645,003

5 Claims. (Cl. 44—7)

The present invention has reference to an improved combustible gel composition having particular utility as a fire starting or kindling material for charcoal and other difficultly ignitable fuel solids.

Charcoal is a popular cooking fuel, especially for broiling and similar techniques which are practiced over open grills and the like. However, charcoal is normally hard to start burning. It may be even more difficult to ignite when it is in the form of compressed briquettes or tablets and the like which are easier to handle than the normally obtained product and oftentimes more appealing to the user, especially for non-commercial purposes.

A large number of materials and compositions are known to exist or have been proposed for starting fires with charcoal and other solids fuels. Many of these are liquids which are either hazardous solvents and undesirable from that standpoint or, if they are relatively safe, have such high flash points as to be poorly ignitable in and of themselves. Furthermore, it is oftentimes necessary to use inordinate quantities of a liquid starter and its effective application to a mass of fuel for ignition purposes may not be easy to achieve. The known solid kindling compositions, for one reason or another, seem to have been unsuccessful. They have met with little popular acceptance.

It would be advantageous and it is the principal object of the present invention to provide an improved kindling composition for charcoal and other solid fuels. A particular objective of the invention is to provide a novel and exceptionally useful combustible gel for such purposes. Another objective is for such gel to have a paste-like consistency so that it can be packaged in and quite easily extruded from collapsible tubes and the like. This would secure the utmost in convenience for its distribution, handling and use. A further objective is for such gel to have properties that would enable it to cling or adhere to the surface of the solid fuel upon which it is applied in order to achieve maximum efficiency and advantage when employed for its intended purpose as a kindler. Yet another objective of the invention is to provide an easily ignitable composition that would not have the hazardous characteristics of volatile solvents and which could be employed for starting charcoal and the like fires in relatively small, quick-burning, economical and effective quantities that would not leave or generate objectionable or long-lasting malodorous fumes. The latter features, of course, would avoid the usual difficulties and drawbacks associated with many liquid kindlers.

These and related objects and other advantageous features and benefits are provided for by a combustible gel composition in accordance with the present invention which comprises an extrudable formulation, in the hereinafter described proportions, of powdered charcoal, water, a lower aliphatic alcohol containing one to three carbon atoms in its molecule, and a water soluble hydroxypropyl methyl ether derivative of cellulose that contains from about 5 to 12 percent by weight of hydroxypropoxy groups and from about 27 to 30 percent by weight of methoxy groups, based on the weight of the cellulose ether. Advantageously, the cellulose ether derivative that is employed contains from about 7 to 12 percent by weight of hydroxypropoxyl groups and from about 28 to 30 percent by weight of methoxyl groups. Any viscosity grade of the cellulose ether that is available may be utilized satisfactorily. Generally, however, within the hereinafter indicated limits, it is possible to achieve satisfactory results with relatively smaller quantities of the cellulose ether being required when higher viscosity grades of the ether are utilized. For most purposes, an ether having a viscosity of about 4,000 centipoises (as measured in a 2 percent by weight aqueous solution of the ether at 20° C.) may be quite suitable to employ. Cellulose ether derivatives of this type are similar to or identical with those that may be obtained from The Dow Chemical Company under the trade-designations "Methocel 65 HG" and "Methocel 60 HG." The latter is believed to have a higher proportion, within the indicated range, of hydroxypropoxy groups in its composition.

The broadly operable and more narrowly preferred proportions of ingredients in the combustible gels of the present invention are set forth in the following tabulation in the form of percentage by weight ranges. As is apparent, methanol, ethanol or either of the propanols, as well as mixtures thereof, can be employed as the alcohol. It is advantageous for the powdered charcoal that is utilized to have an average particle size smaller than about 20 mesh in the U. S. standard sieve series with greater fineness being increasingly more desirable.

| Ingredient | Operative Range, percent | Preferred Range, percent |
|---|---|---|
| Cellulose Ether | 1.5–3.25 | 2.0–2.7 |
| Alcohol | 55–76 | 65–70 |
| Water | 7–15 | 7–10 |
| Charcoal | 5–27 | 20–27 |

All of the compositions according to the invention are uniformly homogeneous; easily extrudable and well adapted to be packaged and handled in collapsible tubes. They cling nicely to the surface of charcoal or wood (including twigs and branches) when applied thereto and ignite gently, quickly and easily, to burn with a hot, rapid flame with little, if any, sparking or odor. They have excellent shelf life and can be stored for long periods without significant loss of properties taking care, of course, to avoid undue evaporation.

In their preparation, it is generally best to first wet the cellulose ether with the alcohol, before incorporating and uniformly interblending the charcoal and water, in any order that may be desired, in the composition. Any conventional mixing techniques and apparatus are usually capable of accomplishing the desired blending. If desired, minor proportions of organic solvents such as benzene, naphtha and other petroleum spirits and the like can also be incorporated in the composition although this is by no means necessary and, ordinarily, may be just as well avoided. Likewise, other conventional additives for alcohol and fuel gels may also be used in very small quantities in the compositions. These may include, on an optional and by no means preferred or required basis, such ingredients as dyestuffs, pigments, denaturants and oxidizing agents, including inorganic nitrate salts and the like.

A number of combustible gel compositions were prepared with both 4,000 centipoise viscosity grade of "Methocel 60 HG" and "Methocel 65 HG" using the ingredients within the indicated ranges of proportions. All of the resulting compositions had the mentioned beneficial and desirable properties and characteristics. When preparations were made with one or more of the ingredients in proportions smaller or greater than the described operable quantities, dissatisfactory results were generally obtained. For example, too much charcoal cannot be tolerated in order to obtain suitable suspensions in the gel or to provide satisfactorily extrudable compositions and to avoid excessive interfering absorption of the liquid constituents. Too much alcohol or not enough water may render it difficult to solubilize the gel and prevent satisfactory dispersion of the cellulose ether. Too much water may hamper the ignition and burning characteristics of the composition. An especially good composition was prepared with about 2.7 percent by weight, based on the weight of the composition, of a hydroxypropyl methyl ether of cellulose (that contained 27–29 percent by weight, based on the weight of the ether, of methoxy groups and 7–12 percent by weight of hydroxypropoxy groups); 66.9 percent of methanol; 7.4 percent by weight of water; and 23.0 percent by weight of 40 mesh charcoal powder.

What is claimed is:

1. Combustible gel composition comprising a uniform, extrudable mixture of a hydroxypropyl methyl ether derivative of cellulose; an aliphatic alcohol containing one to three carbon atoms in its molecule; water; and finely divided charcoal proportioned according to the following tabulation:

| Ingredient: | Percentage by weight |
|---|---|
| Cellulose ether | 1.5–3.25 |
| Alcohol | 55–76 |
| Water | 7–15 |
| Charcoal | 5–27 | wherein the cellulose ether derivative contains from about 5 to 12 percent by weight of hydroxypropoxy groups and from about 27 to 30 percent by weight of methoxy groups, based on the weight of the ether.

2. Combustible gel composition comprising a uniform, extrudable mixture of a hydroxypropyl methyl ether derivative of cellulose; an aliphatic alcohol containing one to three carbon atoms in its molecule; water; and finely divided charcoal proportioned according to the following tabulation;

| Ingredient: | Percentage by weight |
|---|---|
| Cellulose ether | 2.0–2.7 |
| Alcohol | 65–70 |
| Water | 7–10 |
| Charcoal | 20–27 | wherein the cellulose ether derivative contains from about 5 to 12 percent by weight of hydroxypropoxy groups and from about 27 to 30 percent by weight of methoxy groups, based on the weight of the ether.

3. The composition of claim 2, wherein the cellulose ether derivative contains from about 7 to 12 percent by weight of hydroxypropoxy and from about 28 to 30 percent by weight of methoxy groups.

4. The composition of claim 2, wherein the alcohol is methanol.

5. The composition of claim 2, wherein the charcoal is a powder having an average particle size that is finer than about 20 mesh in the U. S. standard sieve series.

References Cited in the file of this patent

UNITED STATES PATENTS

| 123,683 | Dennis et al. | Feb. 13, 1872 |
| 2,248,048 | Allen et al. | July 8, 1941 |
| 2,578,432 | Labour | Dec. 11, 1951 |